H. GREENE.
WAGON.
APPLICATION FILED MAY 19, 1909.
974,877.
Patented Nov. 8, 1910.
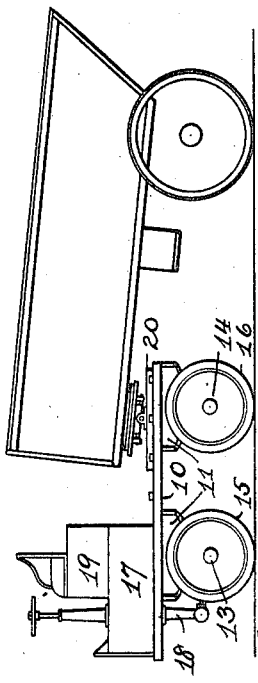
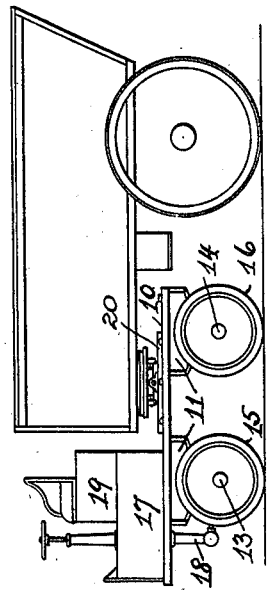
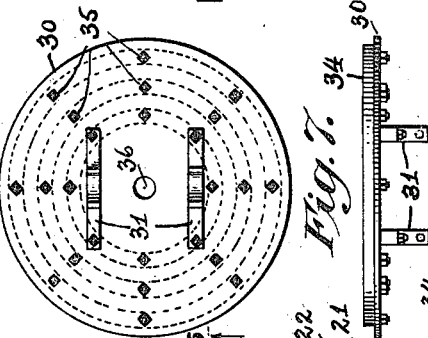
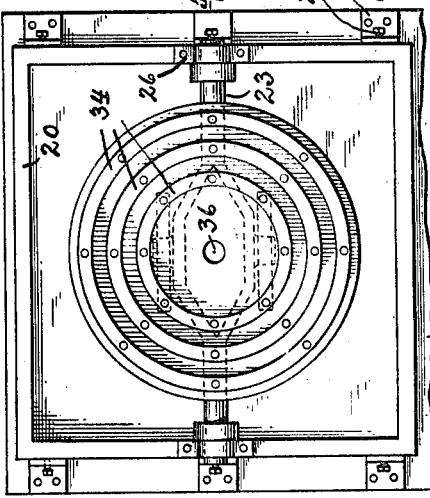
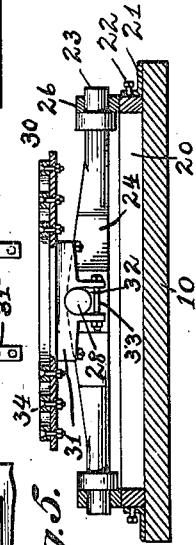
Attest:
Sara G. O'Rourke
Alan C. McDonnell
Howard Greene, Inventor:
by William R. Baird
his Atty.

UNITED STATES PATENT OFFICE.

HOWARD GREENE, OF CRANFORD, NEW JERSEY, ASSIGNOR OF ONE-THIRD TO WALTER F. BLAISDELL, OF BROOKLYN, NEW YORK, AND ONE-THIRD TO JOHN H. KENNARD, OF NEW YORK, N. Y.

WAGON.

974,877.   Specification of Letters Patent.   Patented Nov. 8, 1910.

Application filed May 19, 1909. Serial No. 496,912.

*To all whom it may concern:*

Be it known that I, HOWARD GREENE, a subject of the King of Great Britain and Ireland, and resident of Cranford, Union county, New Jersey, have invented certain new and useful Improvements in Wagons, of which the following is a specification.

This invention relates to wagons and similar vehicles provided with fifth wheels and its novelty consists in the means employed to convert such a device from a horse drawn to a motor impelled vehicle. Attempts have been made from time to time to effect such conversion by providing a support for a motor under the body of the wagon and inserting a transmission gearing between the rear axle and the motor. This system frequently necessitates an entire reorganization of the wagon and is quite expensive. I have devised a system for this kind of conversion which is simple and cheap and which enables me to use the same traction mechanism for wagons of different sizes and heights.

In the drawings, Figure 1 is a side elevation of a vehicle embodying the invention; Fig. 2 is a similar view of a vehicle also embodying the invention but with a wagon body positioned normally lower than the body of the wagon shown in Fig. 1; Fig. 3 is an enlarged plan view of the lower part of the coupling frame; Fig. 4 is a similar view of the same parts with the coupling plate removed; Fig. 5 is a side elevation and partial vertical section on the plane of the line 5—5 in Fig. 3; Fig. 6 is a bottom plan view of the coupling plate and Fig. 7 is an edge view thereof.

In the drawings, 10 is the platform of a forward truck of a wagon. From this depended on each side two brackets 11 11 which are supported on axles 13 and 14 on which are adapted to turn wheels 15 and 16.

17 indicates a battery, engine or any suitable form of motor and 18 indicates a driving connection between it and the wheels of the truck. The form and kind of motor and propelling mechanism employed are immaterial. They form no part of this invention and may be of any approved form usual in the art.

19 indicates a tool box or seat casing.

Mounted on the upper surface of the platform 10 and secured thereto in any adjustable manner, as by angle irons 21 and screws 22, is a frame 20. At suitable places in two opposite members of the frame there are formed bearings adapted to receive the transverse trunnions 23, 23, of a frame 24 apertured at 25 to admit of the passage of a king bolt, hereinafter referred to. Caps 26 secured in place by bolts or screws 27 prevent the vertical displacement of these trunnions from their bearings. Two stub shafts 28, 28, project laterally from the frame 24 but longitudinally of the truck. A coupling plate 30, comprising a circular disk is provided on its lower surface with two depending flanges 31, 31. Each of these flanges is recessed at 32 to fit over the members 28 on which they rest and oscillate. A strap or bolt 33 crossing the recess 32 prevents the vertical displacement of the plate 30 on the frame 24. On its upper surface, the plate 30 is provided with a series of concentric rings 34 removably secured in place on the disk by any suitable means as bolts 35.

It is obvious that by means of the trunnions 23 adapted to oscillate in one direction, and the flanges 31 adapted to oscillate on the shafts 28 in a direction at right angles thereto, the plate 30 is connected to the platform 10 by a universal joint.

The lower front part of the body of every wagon of the kind referred to is provided with a fifth wheel and the purpose of the construction just described is to provide a traction truck provided with means which will afford a suitable and proper coöperating connection with the upper part of the fifth wheel on the wagon, whereby when the forward truck, to which has been attached the wagon or pole or shafts is removed, the body of the wagon can be at once connected to the new truck, so that the upper part of its fifth wheel will at once engage with the upper surface of the coupling plate 30 in the same manner that it did with the upper surface of the fifth wheel on the old truck upon which it was formerly mounted.

The rings 34 are intended to afford engaging surfaces with fifth wheels of different sizes. A central aperture 36 in the plate 30 is intended to receive the king bolt joining the upper part of the fifth wheel to the lower part and the universal joint interposed between the plate 30 and the platform 10 is to enable the same forward truck to be coupled to wagon bodies of different heights. As the plate 30 is tiltable in two directions, it is evident that it can meet any variations in height or symmetry in such wagon body. Moreover, as the subframe 20 may be longitudinally moved and then secured in its new position by means of the angle irons 21 and screws 22, any variation in length of the wagon body can be accommodated.

The king bolt projecting below the plate 30 and immediately over the center of the trunnion frame 24, said frame is provided with the opening 25 to accommodate the lower portion of the king bolt, and inasmuch as the king bolt swings in a longitudinal plane with relation to the frame 24, the opening 25 is made of a sufficient size to permit this motion.

The provision of the concentric rings 34 on the plate 30 forms concentric grooves into which the corresponding parts of the fifth wheel enter, the grooves providing concentric guide ways to relieve the king bolt of much of the strain which would otherwise be brought upon it.

There is much wear between the fifth wheel and its supporting plate, and the securing of the concentric rings 34 removably upon the plate 30 by means of the bolts 35, permits of the replacement with new rings, any which may be broken or sufficiently worn to cause a bad fit, or too much lost motion.

This invention enables the owner of expensive wagons of the kind described to dispense with the present front wheels and their connections and substitute motor traction devices with little effort or expense.

What I claim as new is:—

1. A truck platform, a frame, means for adjustably securing the frame to the platform, and including angle irons and screws, a plate above the frame, and a universal joint between the plate and the frame.

2. A wagon truck provided with a platform, a rectangular frame on the top of the platform, means for adjustably and removably securing the frame to the platform, bearings on the sides of the frame, a frame comprising trunnions adapted to rest in the bearings and stub-shafts at right angles to the trunnions, a plate above the trunnion frame, depending bearings on the plate resting over the stub-shafts, a fifth wheel resting on the plate and a vehicle body resting on the fifth wheel.

3. In a vehicle of the class described, the combination of a truck frame, a plate supported thereon, a series of concentric rings removably secured upon its upper face spaced apart to form a series of concentric grooves or guideways between them, to accommodate different sizes of fifth wheels, a wagon body and a fifth wheel on the wagon body adapted to engage in one of said concentric guideways.

4. In a vehicle body, the combination of a truck frame, a plate supported thereon provided with a central opening, a series of concentric rings removably secured upon its upper face and spaced apart to form a series of concentric grooves or guideways between them to accommodate different sizes of fifth wheels, a wagon body and a fifth wheel adapted to engage in one of said concentric guideways, and having a large central opening and a king bolt passing through said central openings of the plate and fifth wheel, with space to oscillate therein.

5. In a vehicle, the combination of a wagon truck, a plate adjustably secured thereon provided with a central opening and a series of concentric rings removably secured upon its upper face and spaced apart to form a series of concentric grooves or guideways between them to accommodate different sizes of fifth wheels, a vehicle body, a fifth wheel secured under the body and adapted to engage in one of said guideways, and having a central opening, a king bolt passing through the central openings of the plate and fifth wheel, and a universal joint between the truck and plate, comprising a member extending across the vertical line of the king bolt and provided with an opening into which the king bolt projects and in which it is permitted to oscillate.

Witness my hand this 18th day of May, 1909, at New York, N. Y.

HOWARD GREENE.

Witnesses:
WILLIAM R. BAIRD,
ALAN C. McDONNELL.